(12) United States Patent
Dalton et al.

(10) Patent No.: US 7,046,927 B2
(45) Date of Patent: May 16, 2006

(54) INTERACTIVE VIRTUAL REALITY PHOTO GALLERY IN A DIGITAL CAMERA

(75) Inventors: Dan L. Dalton, Greeley, CO (US); Christopher S. Dalton, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 234 days.

(21) Appl. No.: 10/895,459

(22) Filed: Apr. 6, 2004

(65) Prior Publication Data

US 2006/0062564 A1    Mar. 23, 2006

(51) Int. Cl.
*G03B 17/00* (2006.01)
*H04N 5/222* (2006.01)

(52) U.S. Cl. ............ 396/287; 348/333.05; 348/333.12

(58) Field of Classification Search ............... 396/287, 396/291; 348/333.01, 333.05, 333.12

See application file for complete search history.

(56) References Cited

U.S. PATENT DOCUMENTS

| | | | | |
|---|---|---|---|---|
| 5,513,991 | A * | 5/1996 | Reynolds et al. | 434/81 |
| 6,121,969 | A * | 9/2000 | Jain et al. | 715/850 |
| 6,344,836 | B1 * | 2/2002 | Suzuki | 345/2.1 |
| 6,536,965 | B1 * | 3/2003 | Nakajima | 400/62 |
| 6,909,443 | B1 * | 6/2005 | Robertson et al. | 715/782 |
| 6,964,025 | B1 * | 11/2005 | Angiulo et al. | 715/838 |
| 2005/0086612 | A1 * | 4/2005 | Gettman et al. | 715/848 |
| 2005/0256877 | A1 * | 11/2005 | Searles et al. | 707/10 |

* cited by examiner

*Primary Examiner*—W. B. Perkey

(57) ABSTRACT

An interactive three-dimensional virtual-reality photo gallery containing pictures taken by a user is displayed on a display of a digital camera 10. The user navigates through the gallery using camera buttons. Methods relating to implementing the virtual-reality photo gallery are also disclosed.

13 Claims, 4 Drawing Sheets

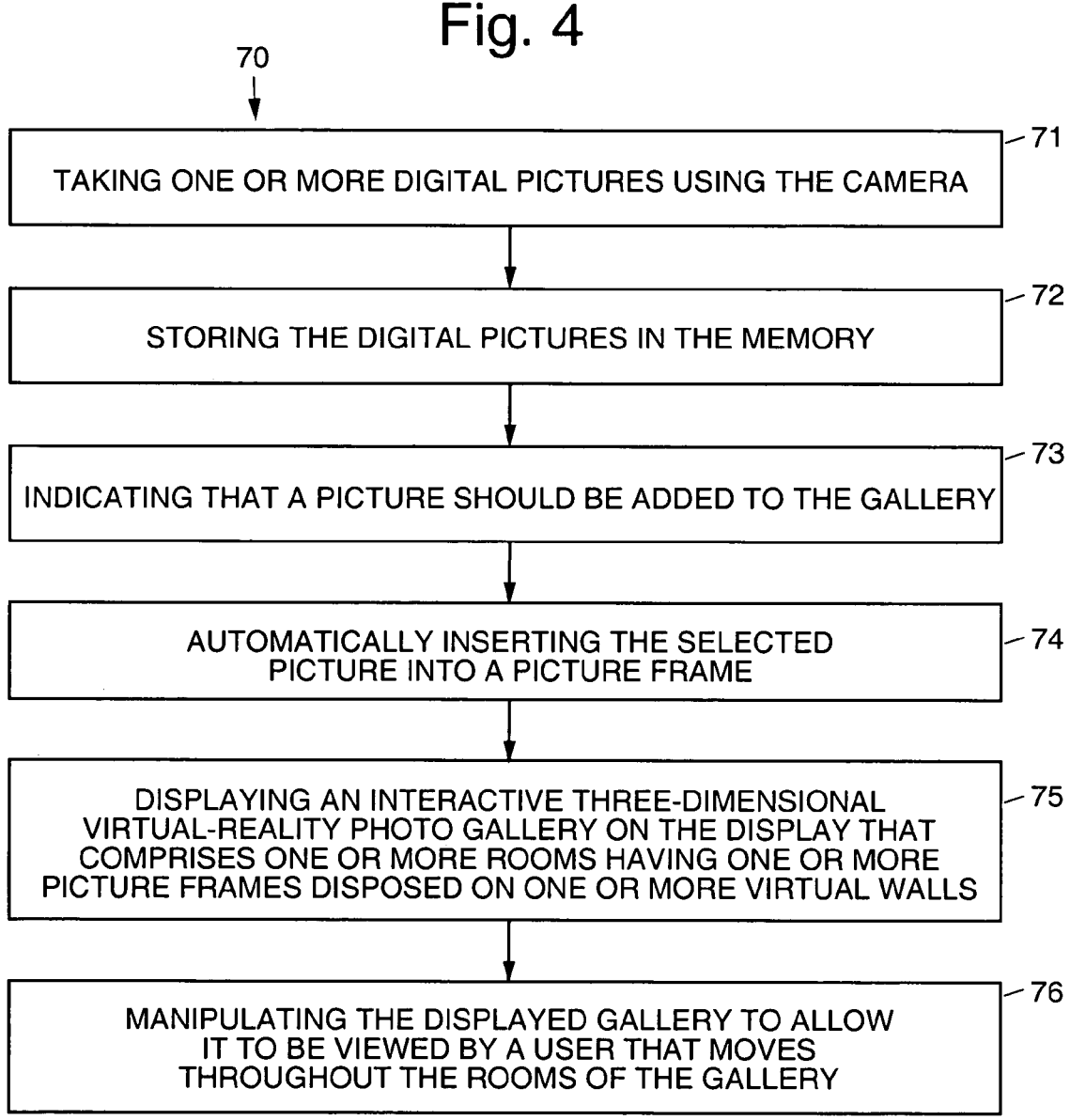

INTERACTIVE VIRTUAL REALITY PHOTO GALLERY IN A DIGITAL CAMERA

TECHNICAL FIELD

The present invention relates generally to digital cameras and methods.

BACKGROUND

All digital cameras of which the present inventor is aware only display images in a flat two-dimensional (2D) image space. However, many three-dimensional (3D) games exist that allow users to wander through a virtual environment. Some architectural programs also exist that allow users to create a three-dimensional model of a house and walk through it.

No digital camera system has the ability to display photos that are taken by a user having a format of a three-dimensional virtual-reality photo gallery. It would be desirable to have a digital camera that could present a three-dimensional virtual-reality photo gallery to a user.

SUMMARY OF THE INVENTION

The present invention comprises a system and methods embodied in a digital camera that provide for an interactive virtual-reality photo gallery. More particularly, the interactive three-dimensional virtual-reality photo gallery contains digital photos taken by a user that are displayed on a display of a digital camera. The user navigates through the gallery using camera buttons. Methods relating to implementing the virtual-reality photo gallery are also disclosed.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 4 illustrates an exemplary method in accordance with the principles of the present invention.

DETAILED DESCRIPTION

Figure 1A:
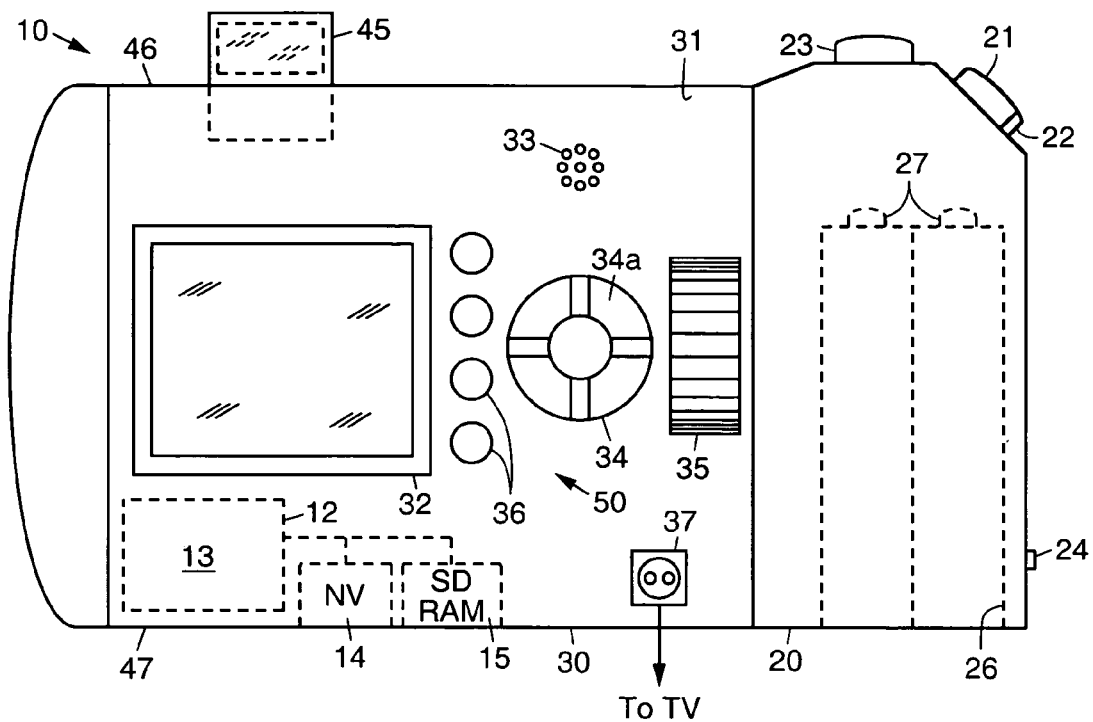
FIGS. 1a and 1b are rear and front views, respectively, of an exemplary digital camera that may be used in a system in accordance with the principles of the present invention.
Figure 1B:
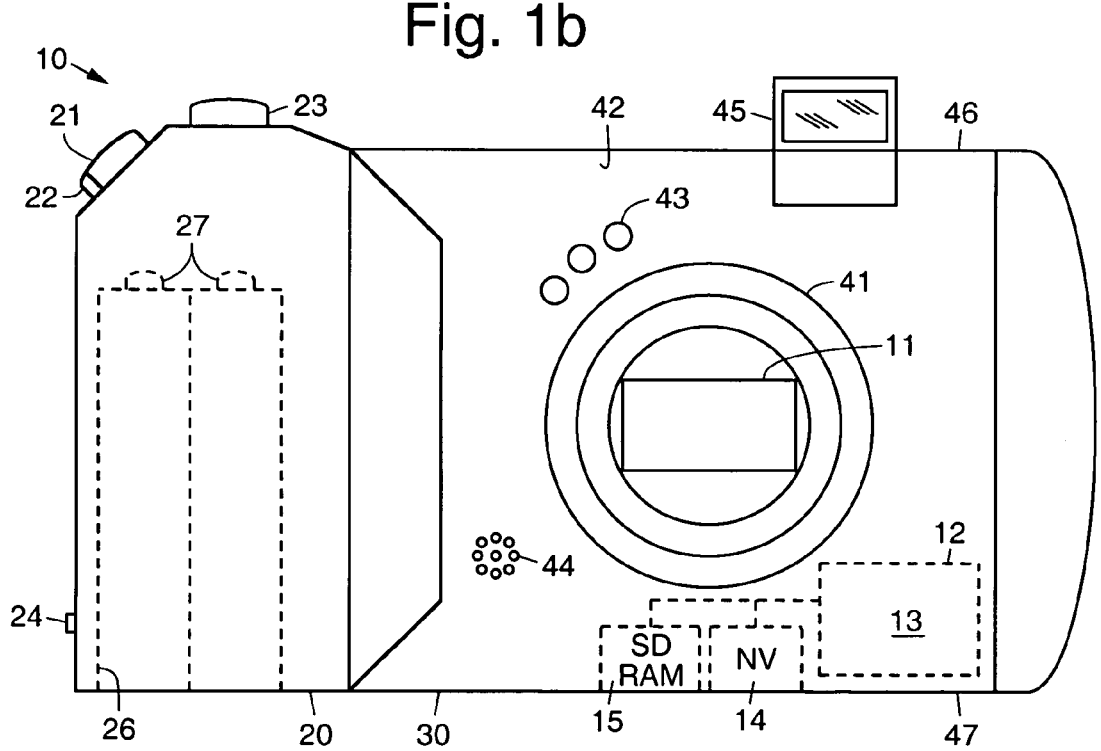

Referring to the drawing figures, FIGS. 1a and 1b are rear and front views, respectively, of an exemplary digital camera 10 implemented in accordance with the principles of the present invention. As is shown in FIGS. 1a and 1b, the exemplary digital camera 10 comprises a handgrip section 20 and a body section 30. The handgrip section 20 includes a power button 21 or switch 21 having a lock latch 22, a record button 23, a strap connection 24, and a battery compartment 26 for housing batteries 27. The batteries may be inserted into the battery compartment 26 through an opening adjacent a bottom surface 47 of the digital camera 10.

As is shown in FIG. 1a, a rear surface 31 of the body section 30 comprises a liquid crystal display (LCD) 32 or viewfinder 32, a rear microphone 33, a joystick pad 34 including a plurality of arrow buttons 34a, a zoom control dial 35, a plurality of buttons 36 for setting functions of the camera 10 and implementing a user interface 50 (generally designated), and a video output port 37 for downloading images to a computer, or connecting the camera 10 to a television screen (TV), for example. As is shown in FIG. 1b, a zoom lens 41 extends from a front surface 42 of the digital camera 10. A front microphone 44 is disposed on the front surface 42 of the digital camera 10. A flash unit 45 is disposed adjacent a top surface 46 of the digital camera 10.

An image sensor 11 is coupled to processing circuitry 12 (illustrated using dashed lines) that are housed within the body section 30, for example. An exemplary embodiment of the processing circuitry 12 comprises a microcontroller (μC) 12 or central processing unit (CPU) 12. The (μC 12 or CPU 12 is coupled to a nonvolatile (NV) storage device 14, such as flash memory 14, for example, and a high speed (volatile) storage device 15, such as synchronous dynamic random access memory (SDRAM) 15, for example.

The processing circuitry 12 (microcontroller (μC) 12 or CPU 12) in the digital camera 10, embodies firmware 13 comprising one or more algorithms 13 in accordance with the principles of the present invention. The firmware 13 or algorithm 13 is operative to implement the user interface 50 (FIGS. 2a, 2b) and interactive virtual-reality photo gallery 60 (FIGS. 3a–3e) on the display 32 of the digital camera 10.

The interactive three-dimensional virtual-reality photo gallery 60 contains digital photos taken by a user that are displayed on the display 32 of the digital camera 10 in a manner similar to conventional three-dimensional games that allow users to wander through a virtual environment, or architectural programs that allow users to create a three-dimensional model of a house and walk through it. The user navigates through the gallery 60 by using the arrow buttons 34a, for example. The technology used to create the three-dimensional photo gallery 60 on the display 32 is well known to those skilled in the art. This well-known conventional technology is embodied in the digital camera 10 to implement the present invention.

The algorithms 13 used to generate the three-dimensional views are common in the industry. Three-dimensional virtual reality games have been around for several years. However, heretofore, there have been no cameras 10 that include three-dimensional virtual reality rendering. Furthermore, when combined with the "favorite" image concept disclosed herein, users can create three-dimensional photo albums in the camera 10 that provide a uniquely immersive experience for sharing their photos with others either directly on the camera display 32, or on a connected television screen where the interaction is controlled by a remote control.

Figure 2A:
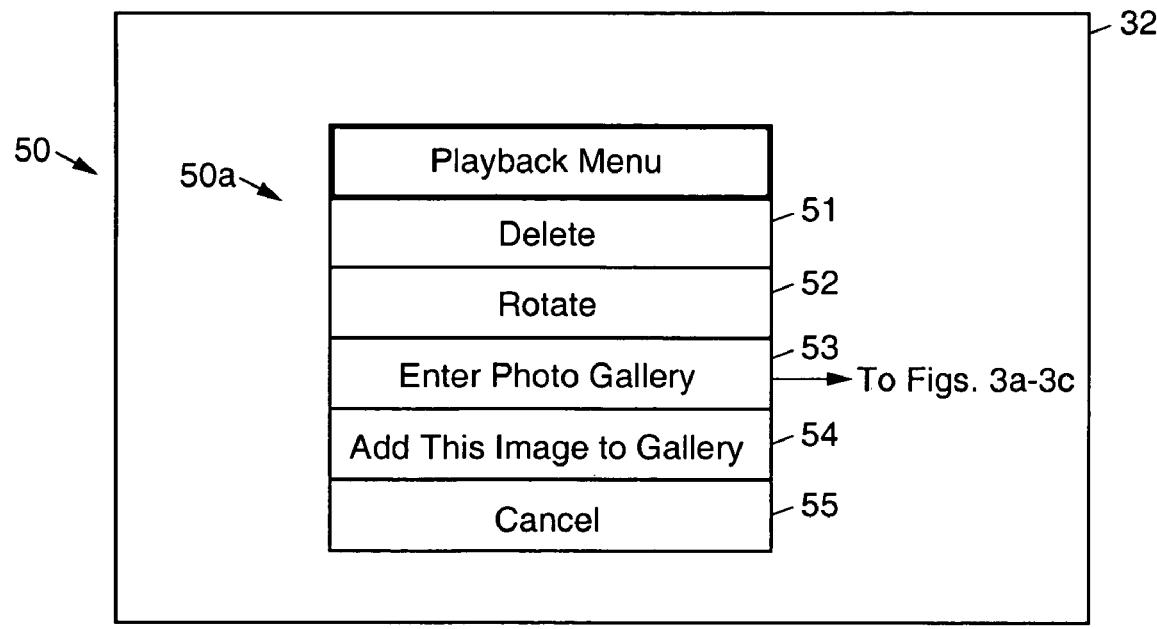
FIGS. 2a and 2b illustrate an exemplary user interface that may be employed in the digital camera shown in FIGS. 1a and 1b.
Figure 2B:
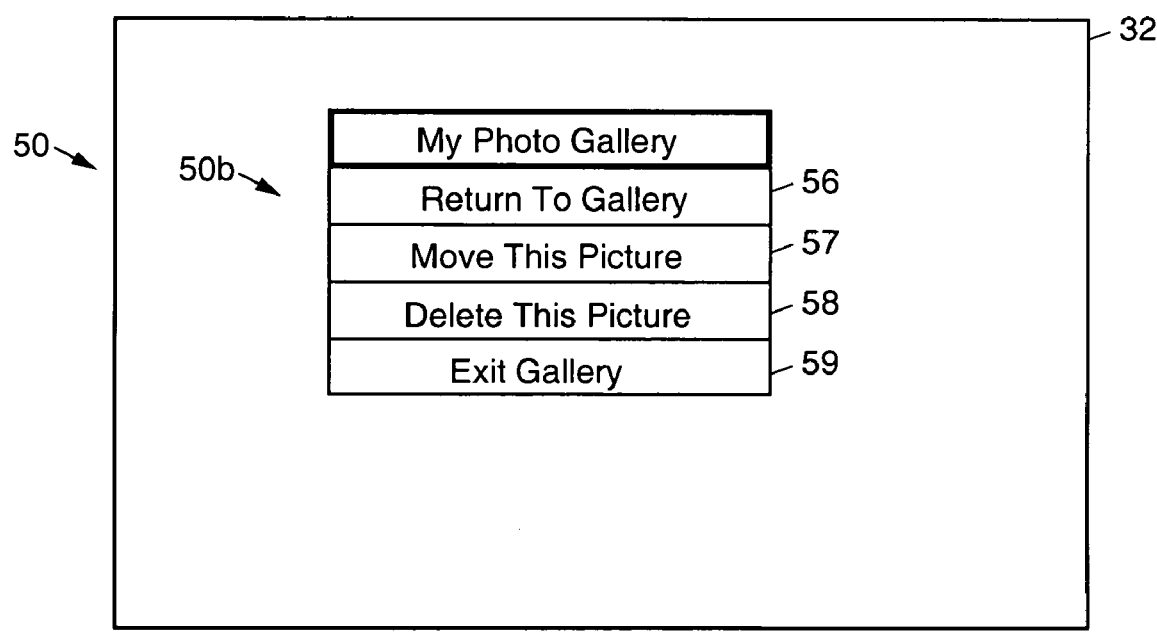
Figure 3A:
FIGS. 3a–3e illustrate exemplary display screens from a prototype embodiment of the present invention.
Figure 3B:
Figure 3C:
Figure 3D:
Figure 3E:

Referring to FIGS. 2a and 2b, they illustrate a portion of an exemplary user interface 50 that may be employed in the digital camera 10 shown in FIGS. 1a and 1b. More particularly, FIGS. 2a and 2b show the part of the interface 50 that is displayed on the display screen 32 of the camera 10, for example. Selected arrow buttons 34a may be used to navigate through photos displayed in the photo gallery 60.

The present invention provides for a user interface 50 that may be used to display all photographs that have been taken and stored in the digital camera 10. The user interface 50 may also be used exclusively for favorite photographs or pictures that were explicitly placed in a gallery by the user.

As is shown in FIG. 2a, the exemplary user interface 50 comprises a playback menu 50a that includes the following menu options (illustrated as a drop-down menu 50a, for example):

Delete 51,
Rotate 52,
Enter Photo Gallery 53,
Add This Image to Gallery 54, and
Cancel 55.

Selecting "Enter Photo Gallery" 53 draws the three-dimensional photo gallery 60 on the display screen 32 of the camera 10, or on the television screen (TV) if the camera 10 is connected to it by way of its video output port 37, for example. An exemplary three-dimensional photo gallery 60 is illustrated in FIGS. 3a–3e.

By way of example, and referring to FIGS. 3a–3e, the gallery 60 may include marble pillars (FIGS. 3d, 3e), wainscoting panels (FIGS. 3a–3e), chandeliers (FIGS. 3a, 3b), water fountains (not shown), exotic carpeting (FIGS. 3a–3e), hallways (FIGS. 3a, 3d), stairs (FIGS. 3a, 3b), multiple gallery rooms with various themes (FIGS. 3a–3e), and large picture frames (FIGS. 3a–3e) containing pictures (FIGS. 3a–3e) that the user had taken and added to the gallery 60.

Selecting "Add This Image to Gallery" 54 stores the current picture in internal flash memory 14 and places it in an unoccupied picture frame, such as is shown in FIGS. 3a–3e. The user is then placed in the gallery 60 facing the new picture. The user can wander around the gallery by pressing and holding selected arrow buttons 34a, for example. If a picture is approached such that a portion of it completely fills the screen 32, the user's position and orientation is slid or moved to an optimum viewing point where the entire picture is visible and completely fills the display screen 32.

Pressing the OK button 34a while in the gallery 60 exits the gallery 60, unless the user is standing in front of a picture that is displayed on a full-screen 32. In that case the following menu 50b (entitled "My Photo Gallery") is displayed, which is shown in FIG. 2b:

Return to Gallery 56,
Move This Picture 57,
Delete This Picture 58, and
Exit Gallery 59.

Selecting "Move This Picture" 57 removes the picture from the current frame and shows an iconic representation of the removed picture on the display. Furthermore, empty picture frames appear in every location where a picture isn't already posted. The user can then walk up to any picture frame until it fills the screen and press the OK button 34a to post the picture in that frame. If the frame already contains a picture, the pictures swap places, causing the one that was just replaced to become the iconic picture being moved.

Selecting "Delete This Picture" 58 deletes the current picture.

Selecting "Exit Gallery" 59 returns the user to the normal display screen 32 to resume normal camera operation.

The use of the interactive virtual-reality photo gallery 60 to display stored photos provides a novel way for users to present their photographs to others. The present invention is intended to provide users with a new way to share the photos they take. Virtually all digital cameras can display previously taken photos. The present invention goes one step further by placing the photos within the virtual three-dimensional photo gallery 60. Users can leisurely stroll through the gallery 60 instead of just flipping through images.

The present invention also gives the users the illusion that their photos are very large because they occupy most of the height of a virtual wall, even though they may be viewed on a very small display 32. Users can further personalize the gallery 60 by grouping photos together in different rooms with different themes. The gallery 60 therefore becomes a virtual extension of the user's home by allowing them to hang photos on walls and invite company to come over take a tour of their home. The novelty and fun of the experience makes sharing photos more enjoyable, thereby encouraging users to share their photos with more people.

This invention gives users a totally new way to enjoy their pictures. The virtual photo gallery 60 gives users a way to share pictures in a very fun and unique way. Many people spend a great deal of time making elaborate photo albums to preserve their photos. The present invention gives users a quick and easy way to display and arrange their photos in a fun, creative, and unique way without the use of scissors, glue and mess.

Another advantage is that the users frequently carry their camera 10 with them, but rarely carry their photo albums. This vastly increases the number of opportunities to invite friends to stroll through their virtual photo gallery. Furthermore, the three-dimensional nature of the gallery adds a new dimension beyond a typical photo album, making the experience more fun, further encouraging users to share their photos.

The present invention also provides for a method 70 of displaying photographs on the digital camera 10. The exemplary method 70 is used with a digital camera 10 that comprises a lens 41, an image sensor 11, a memory 14 for storing digital pictures, a display 32, a user interface comprising buttons for performing predefined tasks, and processing circuitry 12 coupled to the lens, image sensor, memory and user interface, and firmware 13 that runs on the processing circuitry. A generalized exemplary method 70 comprises the following steps.

One or more digital pictures are taken 71 using the camera. The digital pictures are stored 72 in the memory. The user indicates that the current picture should be added to the gallery 73. The picture is automatically placed in the next available picture frame 74. An interactive three-dimensional virtual-reality photo gallery 60 is displayed 75 on the display that comprises one or more rooms having one or more picture frames disposed on one or more virtual walls. The method may further comprise the step of manipulating 76 the displayed gallery to allow it to be viewed by a user that moves throughout the rooms of the gallery.

Thus, digital cameras and methods that provide for an interactive virtual-reality photo gallery have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A digital camera comprising:
   a display;
   a memory for storing pictures;
   a plurality of buttons 34 for implementing a user interface;
   processing circuitry coupled to the lens, image sensor, display, buttons and memory; and
   firmware that runs on the processing circuitry, that implements the user interface in conjunction with the buttons, that displays an interactive three-dimensional virtual-reality photo gallery on the display comprising one or more virtual rooms having one or more selectable picture frames disposed on one or more virtual walls and that selectively displays one or more digital pictures taken by a user surrounded by one or more picture frames.

2. The digital camera recited in claim 1 wherein the user interface comprises a playback menu comprising a selectable icon that allows a user to enter the photo gallery to view pictures, and another icon that allows the user to add a selected picture to the photo gallery.

3. The digital camera recited in claim 1 wherein the firmware configures the interactive three-dimensional virtual-reality photo gallery to contain elements selected from the group consisting of pillars, wainscoting, chandeliers, carpeting, hallways, stairs, rooms, and picture frames.

4. The digital camera recited in claim 1 wherein the firmware configures the user interface to allow the user to navigate through the gallery using the buttons 34.

5. The digital camera recited in claim 1 further comprising:
a video output port that is connectable to a television for replicating the display screen.

6. The digital camera recited in claim 2 wherein entering the photo gallery, displays the three-dimensional photo gallery on the display screen of the camera.

7. The digital camera recited in claim 1 further comprising a video output port that is connectable to a television for replicating the display screen, and wherein the photo gallery icon, when selected to enter the photo gallery, displays the three-dimensional photo gallery on the television.

8. The digital camera recited in claim 2 wherein the firmware corresponding to the another icon adds a picture to the photo gallery by storing the picture in the memory, placing it in an unoccupied picture frame, and configuring the display so as to place the user in the gallery facing the picture.

9. The digital camera recited in claim 8 wherein the firmware and the user interface cooperate to move the gallery 60 that is displayed so that the user moves through the gallery.

10. The digital camera recited in claim 1 wherein, if a picture is visible and selected (i.e. it completely fills the display), the firmware 13 and the user interface cooperate to allow the user to selectively (1) return to the gallery, (2) move the picture that is displayed, (3) delete the picture that is displayed, and (4) exit the gallery.

11. A method for use with a digital camera 10 that comprises a lens, an image sensor, a memory for storing digital pictures, a display, a user interface comprising buttons for performing predefined tasks, processing circuitry coupled to the lens, image sensor, memory and user interface, and firmware that runs on the processing circuitry, comprising the steps of;
taking one or more digital pictures using the camera;
storing the digital pictures in the memory;
indicating that a picture should be added to the gallery;
automatically inserting the selected picture into an available picture frame;
displaying an interactive three-dimensional virtual-reality photo gallery 60 on the display that comprises one or more rooms having one or more selectable picture frames disposed on one or more virtual walls; and
manipulating the displayed gallery to allow it to be viewed by a user that moves throughout the rooms of the gallery.

12. The method recited in claim 11 further comprising the step of manipulating the displayed gallery to allow it to be viewed by a user that virtually moves throughout the rooms of the gallery.

13. A digital camera comprising:
a lens;
image sensor means for recording pictures viewed by the lens;
display means for displaying the pictures and images;
memory means for storing the pictures;
a plurality of buttons 34 and for implementing a user interface;
processing means coupled to the lens, image sensor means, display means, buttons and memory means that comprises firmware that implements the user interface in conjunction with the buttons, that displays an interactive three-dimensional virtual-reality photo gallery on the display means comprising one or more virtual rooms having one or more selectable picture frames disposed on one or more virtual walls and that selectively displays one or more digital pictures taken by a user surrounded by one or more picture frames.

* * * * *